United States Patent [19]

Miyakawa et al.

[11] 4,379,517
[45] Apr. 12, 1983

[54] MAGNETIC TAPE RUNNING SYSTEM

[75] Inventors: Seii Miyakawa; Manabu Ikeda, both of Yokohama; Shin Hashizume, Kamakura; Kazunori Iijima, Shimoinayoshi, all of Japan

[73] Assignee: Hitachi, Ltd., Tokyo, Japan

[21] Appl. No.: 201,615

[22] Filed: Oct. 28, 1980

[30] Foreign Application Priority Data

Oct. 29, 1979 [JP] Japan .................. 54-138791

[51] Int. Cl.³ ............................ B65H 17/22
[52] U.S. Cl. .................... 226/189; 242/76; 242/209
[58] Field of Search ............... 226/189, 190, 194, 196, 226/200; 242/197–204, 206–210, 74, 76; 360/85, 130.23, 130.24

[56] References Cited

U.S. PATENT DOCUMENTS 3,319,014  5/1967  Sugawa .................. 360/130.23
3,679,840  7/1972  Maxey .................... 360/130.23

Primary Examiner—Leonard D. Christian
Attorney, Agent, or Firm—Antonelli, Terry & Wands

[57] ABSTRACT

A magnetic-tape running system for a video tape recorder having inclined pins and/or guide rollers having distant flanges. The pins and the guide rollers are inclined at suitable angles in the front and back directions and left and right directions so that the tape is guided only at its lower edge in such a manner that the tape runs stably along the cylinder lead at a constant contact pressure.

5 Claims, 9 Drawing Figures

FIG. 6
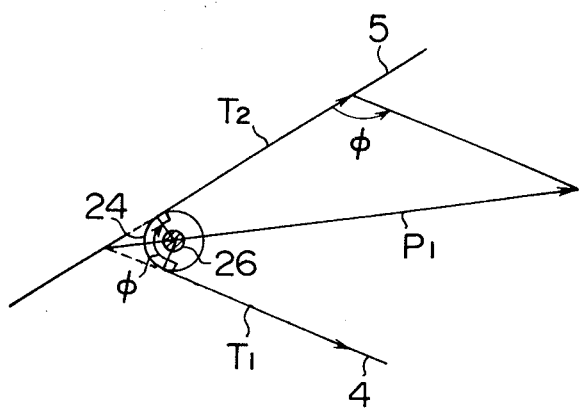
FIG. 7
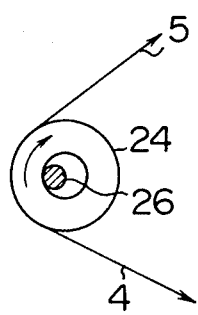
FIG. 8
$$(M_2 \frac{r_1}{R} + M_3 \frac{r_2}{R}) = (T_2 - T_1) = P_R$$
$$M = \sqrt{M_1^2 - P_R^2}$$

4,379,517

MAGNETIC TAPE RUNNING SYSTEM

BACKGROUND OF THE INVENTION

The present invention relates to a magnetic tape running system and, more particularly, to a mechanism which can facilitate the adjustment of the tape running system of a video tape recorder (referred to as a VTR, hereinafter).

In the tape running mechanism of a conventional VTR, the flat part of the tape is guided by a tapered pin or flange-equipped guide rollers and, in addition, the upper and lower edges of the tape are suitably guided in such a manner that the lower edge of the tape moves correctly along the cylinder lead. This in turn requires a height adjustment of the tape employing a suitable height adjusting means such as a flange for adjusting the tape height and taking a considerably long time for the adjustment as well as skill. In addition, curls are liable to be generated at the upper edge of the tape resulting in a deterioration of the tape, particularly in the shortening of life of the acoustic region of audio track provided at the tape edge.

SUMMARY OF THE INVENTION

Under this circumstance, the present invention aims as its major object at providing a novel tape running system which can eliminate the height adjustment by the flange of the guide rollers, which is one of the most troublesome operations in the adjustment of a VTR, and can diminish remarkably the time required for the adjustment, while avoiding the damaging of the tape at the upper and lower edges thereof, thereby to overcome the aforementioned problems of the prior art.

To this end, in the tape running system of the invention, the tapered pin and/or the guide roller having spaced flanges are provided with angles in the back and forth directions, as well as in the left and right directions, so that the upper and lower edges are not guided by the tapered pin or guide roller, but the lower edge of the tape is guided by a tape guide such that the lower edge of the tape runs along the cylinder lead surface while making a contact at a constant pressure with the latter, thereby to ensure a stable running of the tape.

In addition, the determination of the inclination angle of the inclined pin and the guide roller can be made in such a manner as to afford the greatest adjusting margin of the part to be adjusted and the greatest tolerance of the part size.

The above and other objects, as well as advantageous features of the invention will become clear from the following description of the preferred embodiments taken in conjunction with the accompanying drawings.

BRIEF DESCRIPTION OF THE DRAWINGS

FIG. 6 is a vector diagram for use in the analysis of the friction force at a guide roller shown in FIG. 5;

FIG. 7 is a plan view of a sliding frictional contact portion with the clearance between the guide roller and the roller shaft shown in a larger scale;

FIG. 8 is a vector diagram showing the relationship among the friction $M_1$ on the outer surface of a roller, friction $M_2$ on the inner surface of the roller and the friction $M_3$ on the upper end surface of the roller.

DESCRIPTION OF THE PREFERRED EMBODIMENTS

Figure 1:
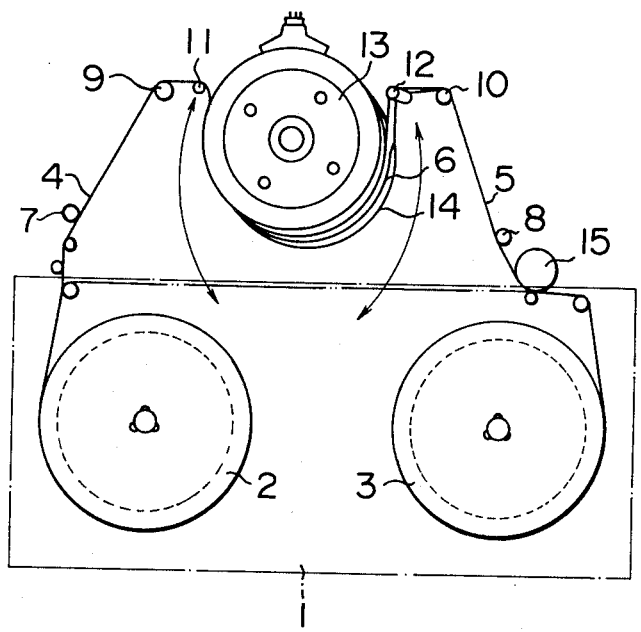
FIG. 1 is a schematic plan view of the construction of tape running system of a conventional VTR.

Referring first to FIG. 1, there is shown a magnetic tape running system of a conventional VTR in which there is provided a cassette 1 provided with an inlet reel 2 and an outlet reel 3 which are adapted to take up an inlet tape 4 and an outlet tape 5. The tape running system further has an inlet tape guide 7 and an outlet tape guide 8, an inlet guide roller 9 and an outlet guide roller 10 and an inlet inclined pin 11 and an outlet inclined pin 12, for allowing the adjustment of heights of the inlet and outlet tapes to make the latter run along the cylinder lead 6.

A reference numeral 13 designates a rotary cylinder, while a stationary cylinder is designated at a reference numeral 14. A reference numeral 15 denotes a pinch roller. The adjustment for making the tape run along the cylinder lead 6 is made in the following manner. Namely, the inlet tape guide 7 and the outlet tape guide 8 are adjusted independently, as well as the pairs of flanges of constant distance provided on each guide roller 9, 10. Further, the inlet and outlet inclined pins 11, 12 are adjusted in an oscillating manner around a reference adjusting point (not shown). Thus, the conventional system requires six independent adjustments for making the tape correctly run along the cylinder lead.

This problem, however, is fairly overcome by the present invention as will be fully understood from the following description of the preferred embodiments. Throughout the drawings, the same reference numerals are used to denote the same member or parts.

Figure 2:
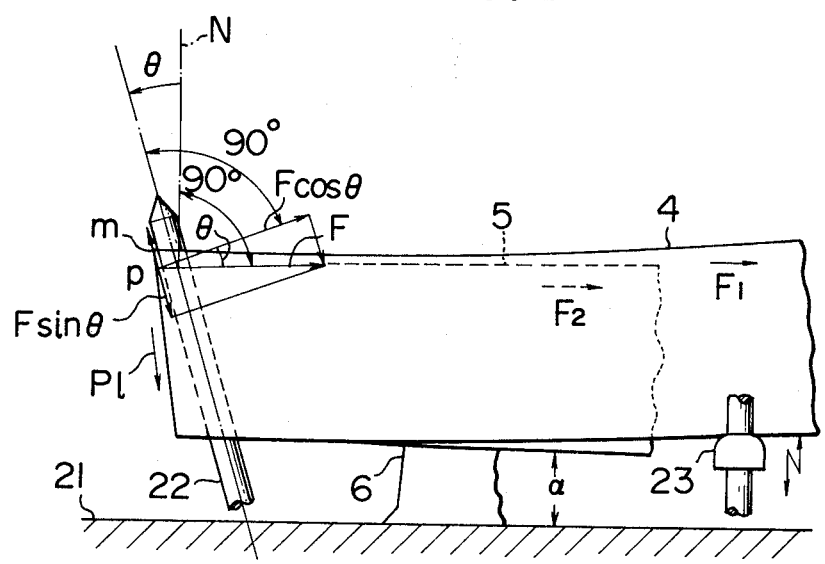
FIG. 2 is a schematic side elevational view of a tape running mechanism constructed in accordance with the invention.
Figure 3:
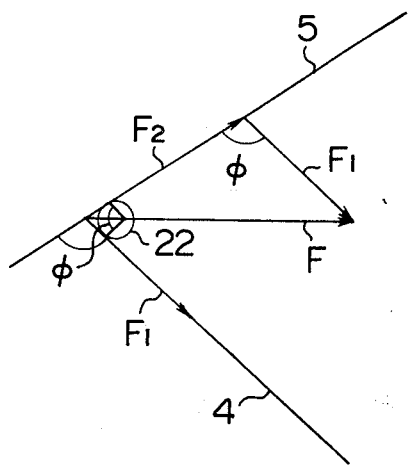
FIG. 3 is a vector diagram of tape tension at an inclined pin incorporated in the tape running mechanism shown in FIG. 2.
Figure 4:
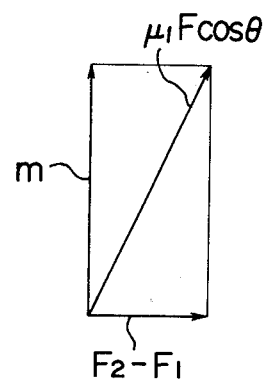
FIG. 4 is a vector diagram showing the relation between the inclined pin and the frictional force of said tape.

Referring first to FIGS. 2, 3 and 4 showing a first embodiment of the invention, a reference numeral 22 denotes an inclined pin which is inclined at an angle $\theta$ to a line N which is normal to the direction of composite force F of the inlet side tape tension $F_1$ and outlet side tape tension $F_2$, in the direction opposite to the tensions in the tapes 4, 5. As a result, a force Pl is generated to urge the tapes 4, 5 downwardly along the axis of the pin 22. The magnitude of the force Pl is determined by an equation (4) which will be given later. It is possible to suitably adjust the component of the force Pl loading a cylinder lead 6, as well as the inlet angle $\alpha$ to a rotary cylinder 13, by finely adjusting the inclination angle $\theta$ through vertically adjusting a tape guide 23 which is in support of the lower edge of the inlet side tape 4. From the condition of balance of force at a point P shown in FIG. 2, the force Pl can approximately be represented by the following equations (1) and (4).

$$Pl \doteq F \sin \theta - m \qquad (1)$$

where,
P1: force downwardly urging the tape along pin axis
F: composite force of inlet and outlet side tape tensions acting on the inclined pin
$\theta$: inclination angle of inclined pin to the line N normal to the composite force F
m: friction force acting to upwardly urge the tape along pin axis From the condition shown in FIG. 2, the composite force F can be represented by the following equation (2).

$$F = \sqrt{F_1^2 + F_2^2 - 2F_1F_2 \cos \phi} \quad (2)$$

where,
F: composite force of the inlet and outlet side tape tensions
$F_1$: inlet side tape tension
$F_2$: outlet side tape tension (determined by $F_1$ and coefficient of friction)
$\phi$: tape winding angle to inclined pin From the condition shown in FIG. 3, the friction force m is represented by the following equation (3).

$$m = \sqrt{(\mu_1 F \cos \theta)^2 - (F_2 - F_1)^2} \quad (3)$$

where,
m: frictional force which urges tape upwardly along pin axis
$\mu_1$: coefficient of friction between tape and inclined pin Substituting equations (2) and (3) to equation (1), the force P1 is represented by the following equation (4).

$$P1 = \sqrt{F_1^2 + F_2^2 - 2F_1F_2 \cos \phi} \cdot \sin \theta - \sqrt{\mu_1 \sqrt{F_1^2 + F_2^2 - 2F_1F_2 \cos \phi} \cdot \cos \theta)^2 - (F_2 - F_1)^2} \quad (4)$$

In the first embodiment, only the adjustment of the inlet and outlet side inclined pins and the adjustment of the guide of the inlet and outlet side guide rollers for the lower end of the tape are required.

A second embodiment of the invention will be described hereinunder with reference to FIGS. 5, 6, 7 and 8.

A freely rotatable guide roller 24 and a stopper 25 are mounted on a roller shaft 26 standing upright from a reference surface 21. Tapes 4, 5 are wound round this guide roller 24 at an angle of $\theta$ to the plane normal to the axis. At the same time, the lower edge of the inlet side tape 4 is guided by a tape guide 23, and the tape is made to run from the inlet side to the outlet side with the lower edge of the outlet side tape 5 moving along the cylinder lead 6. A stable running of the tape is achieved in such a state that the guide roller 24 is pressed against the stopper 25, and the tapes 4, 5 slide upward on the outer peripheral surface of the roller, so that a force P $\downarrow$, which is approximated by a later-mentioned equation (12) is generated so as to press the tape downwardly along the axis of the roller. It is possible to make sure that the tape runs correctly along the cylinder lead through adjusting force P $\downarrow$ and the inlet angle $\alpha$ of the tape relative to the surface S which includes the cylinder lead 6, by a fine adjustment of the value of angle $\theta$ in the equation (12) which in turn is made by a vertical adjustment of the tape guide 23.

The equation (12) is derived as follows.

Figure 5:
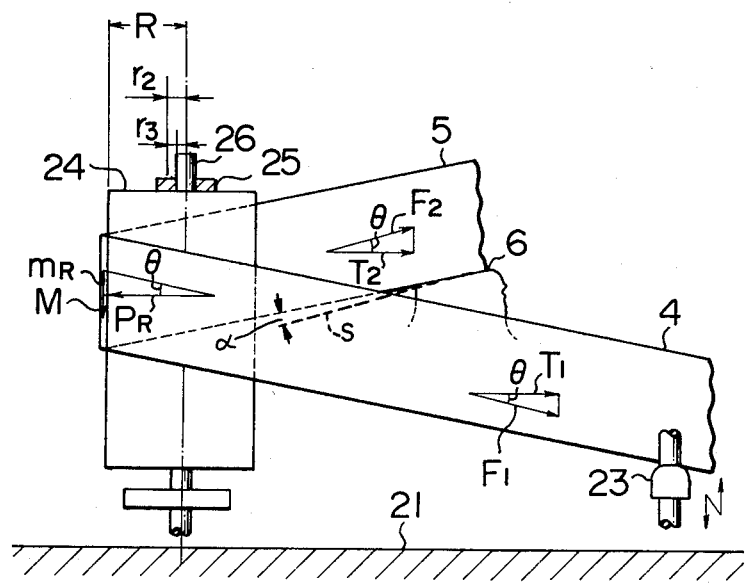
FIG. 5 is a schematic side elevational view of a tape running mechanism constructed in accordance with a second embodiment of the invention.

When the tape is made to run under the condition shown in FIG. 5, the tape moving force $P_R$ generated in the circumferential direction of the roller is expressed by the following equation (5).

$$P_R = T_2 - T_1 = F_2 \cos \theta - F_1 \cos \theta = (F_2 - F_1) \cos \theta \quad (5)$$

$P_R$: tape moving force generated in the circumferential direction of the roller
$F_1$: inlet side tape tension
$F_2$: outlet side tape tension
$T_1$: horizontal component of force $F_1$ ($F_1 \cos \theta$)
$T_2$: horizontal component of force $F_2$ ($F_2 \cos \theta$)

When the tapes 4, 5 are wound round the guide roller 24 and run as shown in FIG. 6, the circumferential frictional force imparted by the roller surface to the tape is approximated by the following equation (6).

$$M_1 = \mu_2 P_1 = \mu_2 \cdot \cos \theta \sqrt{F_1^2 + F_2^2 - 2F_1F_2 \cos \phi} \quad (6)$$

where,
$M_1$: circumferential friction force imparted by roller to tape
$\mu_2$: coefficient of friction between roller and tape
$P_1$: force by which the tape presses the roller by the action of $T_1$, $T_2$ (This force is given, under the condition shown in FIG. 5, by an equation of:

$$P_1 = \sqrt{T_1^2 + T_2^2 - 2T_1T_2 \cos \phi}$$

$$= \cos \theta \sqrt{F_1^2 + F_2^2 - 2F_1F_2 \cos \phi}$$

$\phi$: angle at which tape is wound round roller
When the inner surface of the roller 7 slides on a part of the roller shaft 26 as shown in FIG. 7, the frictional force $M_2$ imparted by the shaft to the inner surface of the roller in the circumferential direction is given by the following equation (7).

$$M_2 = \mu_3 P_2 = \mu_3 \cos \theta \sqrt{F_1^2 + F_2^2 - 2F_1F_2 \cos \phi} \quad (7)$$

where,
$M_2$: frictional force imparted in the circumferential direction by shaft to roller
$\mu_3$: frictional coefficient between roller inner surface and outer peripheral surface of shaft
$P_2$: force at which roller presses roller shaft by the action of $T_1$, $T_2$ ($P_2 = P_1$)

The frictional force $M_3$ which acts between the roller 24 and the stopper 25, when the roller 24 slides along the stopper 25, is represented by the following equation (8).

$$M_3 = \mu_4 P_3 = \mu_4 P \downarrow \quad (8)$$

where,
$M_3$: frictional force imparted in the circumferential direction on the roller by the stopper
$\mu_4$: coefficient of friction between roller and stopper $P_3$: force by which the roller is pressed against the stopper ($P_3 = P\downarrow$)

Referring to FIG. 5, when the tape runs under such a condition as to slide only in the upward direction with respect to the roller by the force $P_R$ acting on the roller, the force downwardly pressing the tape is represented by the following equation (9).

$$P\downarrow = M - mR = \sqrt{(F_1^2 + F_2^2 - 2F_1F_2\cos\phi)\mu_2^2\cos\theta - (T_2 - T_1)^2} - (F_2 - F_1)\sin\theta \qquad (9)$$

where, $P\downarrow$: force downwardly pressing the tape

M: frictional force imparted by the roller to the tape downwardly in the axial direction (See FIG. 8)

$$M = \sqrt{M_1^2 - \left(M_2\frac{r_1}{R} + M_3\frac{r_2}{R}\right)^2} = \sqrt{(\mu_2 P_1)^2 - P_{R2}} = \sqrt{(F_1^2 + F_2^2 - 2F_1F_2\cos\phi)\mu_2^2\cos\theta - (T_2 - T_1)^2}$$

mR: upward component of tape tensions $F_1$, $F_2$ along the axis of roller (See FIG. 5)

$mR = (F_2 - F_1)\sin\theta$ when the tape is made to run in the manner shown in FIG. 5, the horizontal component $T_2$ of the tape tension $F_2$ at the tape outlet side is given by the following equation (10).

$$T_2 = T_1 + \left(P_2\mu_3\frac{r_1}{R}\right) + \left(P_3\mu_4\frac{r_2}{R}\right) \qquad (10)$$

where, $T_2$: horizontal component of outlet side tape tension $T_1$: horizontal component of inlet side tape tension $P_2$: force at which roller presses the shaft under presence of $T_1$, $T_2$ $P_3$: force by which roller is pressed against stopper (in an example, this force is measured to be 5 g)

$\mu_4$: coefficient of friction between roller and stopper (about 0.15 in case of contact between steel and duracon)

$r_1$: radius of roller shaft (e.g. 1 mm)

$r_2$: mean radius of stopper (e.g. 1.5 mm)

R: radius of roller (e.g. 3 mm)

Substituting the constants in equation (10) by the above-mentioned actually measured values, the following equation 11 is derived.

$$T_2 = T_1 + (0.05 \cdot P_2) + (0.075 \cdot P_3) \qquad (11)$$

The value of $P_3$ is actually measured as being not greater than $0.7T_1$, it is possible to consider that there is a relationship expressed by $T_1 >> 0.075P_3 \doteq 0$. The force $P_3$ takes the maximum value when the tape winding angle $\theta$ is 180°. Namely, in this state, the force $P_3$ approximates $2T_1$, i.e. $P_3 \doteq 2T_1$.

In view of a relation expressed by $T_1 >> 0.05P_3 = 0.05 \times 2T_1 = 0.1T \doteq 0$, the equation (11) can be transformed into $T_3 \doteq T_1$ or $F_3 \doteq F_1$.

On this condition, the equation (9) is transformed into the following equation (12).

$$P\downarrow \approx \mu_2 \cos\theta\, F_1 \sqrt{2(1 - \cos\phi)} \qquad (12)$$

From equation (12) above, it will be seen that the component of the force $P\downarrow$ loading the cylinder lead, as well as the inlet angle $\alpha$ can be adjusted by changing the angle $\theta$.

In a second embodiment of the invention, the adjustment is accomplished by winding the tapes round the inlet and outlet side guide rollers at inclination angle $\theta$ to the planes normal to the roller axes and effecting the adjustment of the guide for the lower end of the tape.

FIG. 5 shows the principle of the second embodiment in which the guide roller 24 is vertical to the reference surface 21. This arrangement, however, is not exclusive. Namely, it is possible to beforehand set the height and inclination of the cylinder lead 6 and to decline the roller axis 26 with respect to the reference surface 21.

Figure 9:
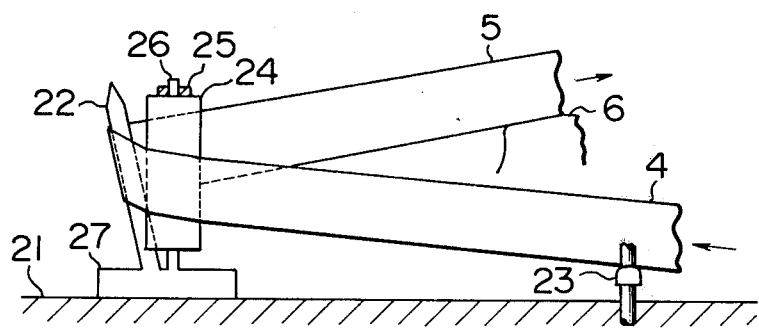
FIG. 9 is a side elevational view of a tape running mechanism constructed in accordance with a third embodiment of the invention.

Referring now to FIG. 9 showing a third embodiment of the invention, an inclined pin 22, which is the same as that shown in FIG. 2, is set on the reference surface 21, together with a base 27 in which incorporated are the roller shaft 26, guide roller 24 and stopper 25 which are similar to those shown in FIG. 5. The outlet/inlet side inclined pin 22 has an axis which is inclined by an angle $\theta_1$ to a plane normal to the composite force of the tape tensions, and the tapes 4, 5 are wound at an inclination angle of $\theta_2$ to the plane normal to the axis of the outlet/inlet side guide roller 24, such that the lower edge of the inlet side tape 4 is guided by the inlet side tape guide 23, while the lower edge of the outlet side tape 5 runs along the cylinder lead 6. The adjustment of height of the outlet/inlet side tape guide 23 is made while the tape is running in the above-stated condition. It is, therefore, possible, by making an efficient use of the advantageous effect brought about by the inclined pin and the guide roller of the first and the second embodiments, to facilitate the setting of the contact pressure between the tape and the cylinder lead, as well as the tape inlet angle.

Thus, the present invention offers the following advantages:

(1) It is possible to shorten the time required for the assembling. Namely, since no flange is formed on the guide roller for stabilizing the running of the tape, the necessity of the heightwise adjustment of the tape, which consumes the longest time in the adjustment operation in the conventional apparatus, is eliminated to reduce the adjusting time correspondingly.

(2) The damage of the tape is diminished, particularly in the case where the tape is thin. In the conventional apparatus, the lower end of the tape is made to run along the cylinder lead by forcibly guiding the upper and lower edges of the tape. According to the invention, however, it is not necessary to forcibly guide the upper and lower edges of the tape around the guide roller.

(3) The productivity of the tape is improved. The conventional tape running mechanism strictly requires a constant tape width. In the mechanism of the invention, since the tape is guided only as its lower edge during the running, the requirement for the constant tape width is less severe. In addition, the generation of curls at the tape edge is avoided even when the tape is thin.

What is claimed is:

1. In a magnetic tape running system in which a magnetic tape is guided by at least one inclined pin such that said magnetic tape runs along a cylinder lead with a selected inlet angle so as to effect magnetic recording and reproduction: the improvement comprising means including a vertically adjustable tape guide for guiding the lower edge of said magnetic tape to determine the vertical position thereof, the axis of said inclined pin being set at a predetermined angle ($\theta$) to a line normal to the composite force of the tape tensions at said pin, said tape guide being vertically adjustable for finely adjusting said predetermined angle ($\theta$) by moving said adjustable tape guide up and down to cause said magnetic tape to move along the selected inlet angle of said cylinder lead.

2. In a magnetic tape running system in which said magnetic tape is guided by guide rollers and tape guides such that said magnetic tape runs along a cylinder lead with a selected inlet angle so as to effect magnetic recording and reproduction: the improvement comprising means including an adjustable tape guide for guiding the lower edge of said magnetic tape to determine the vertical position thereof and a guide roller having a stopper for limiting axial movement of said guide roller around which said tape passes, the inlet side and outlet side of said magnetic tape to said guide roller being inclined downwardly to the inlet side and upwardly to the outlet side respectively at a predetermined angle ($\theta$) to the line normal to the axis of said guide roller, and means for finely adjusting said predetermined angle ($\theta$) by moving up and down said adjustable tape guide to cause said magnetic tape to move along the selected inlet angle of said cylinder lead.

3. In a magnetic tape running system in which said magnetic tape is guided by inclined pins, guide rollers and tape guides such that said magnetic tape runs along a cylinder lead with a selected inlet angle so as to effect magnetic recording and reproduction: the improvement comprising means including an adjustable tape guide for guiding the lower edge of said magnetic tape to determine the vertical position thereof, the axis of said inclined pin being disposed at a predetermined angle $\theta_1$ to a line normal to the composite force of the tape tensions at said pin, a guide roller having a stopper to limit axial movement of said guide roller around which said tape passes, the inlet side and outlet side of said magnetic tape to said guide roller being inclined downwardly to the inlet side and upwardly to the outlet side at a predetermined angle $\theta_2$ to the line normal to the axis of sa guide roller, and means for finely adjusting said predetermined angles $\theta_1$ and $\theta_2$ by moving up and down said tape guide to cause said magnetic tape to move along the selected inlet angle of said cylinder lead.

4. A magnetic tape running system as claimed in claim 1, characterized in that a predetermined angle ($\theta$) satisfies the following equation:

$$Pl \approx \sqrt{F_1^2 + F_2^2 - 2F_1F_2 \cos\phi} \cdot \sin\theta - \sqrt{(\mu_1 \sqrt{F_1^2 + F_2^2 - 2F_1F_2 \cos\phi} \cdot \cos\theta)^2 - (F_1 - F_2)^2}$$

where Pl is the force on the tape in the direction of the axis of said inclined pin, $F_1$ and $F_2$ are the respective tape tensions at the inlet and outlet sides, $\mu_1$ is the coefficient of friction between the inclined pin and the tape, and $\theta$ is the angle at which the tape passes around the inclined pin.

5. A magnetic tape running system as claimed in claim 2, characterized in that a predetermined angle ($\theta$) satisfies the following equation:

$$P\downarrow \approx \mu_2 \cos\theta \, F_1 \sqrt{2(1 - \cos\phi)}$$

where $P\downarrow$ is the force loading the cylinder lead, $\mu_2$ is the coefficient of friction between said roller and the tape, $F_1$ is the tape tension at the inlet side and $\theta$ is the angle at which the tape passes around said roller.

* * * * *